United States Patent
Wang

(10) Patent No.: US 8,820,775 B2
(45) Date of Patent: Sep. 2, 2014

(54) FOLDING GOLF CART

(71) Applicant: Jonathan Hwan Wang, Hayward, CA (US)

(72) Inventor: Jonathan Hwan Wang, Hayward, CA (US)

(*) Notice: Subject to any disclaimer, the term of this patent is extended or adjusted under 35 U.S.C. 154(b) by 67 days.

(21) Appl. No.: 13/687,669

(22) Filed: Nov. 28, 2012

(65) Prior Publication Data

US 2013/0300090 A1  Nov. 14, 2013

(30) Foreign Application Priority Data

May 11, 2012 (CN) ...................... 2012 2 0218142 U

(51) Int. Cl.
| | | |
|---|---|---|
| *B62B 3/02* | (2006.01) | |
| *A63B 55/08* | (2006.01) | |
| *B62B 3/12* | (2006.01) | |
| *B62B 5/04* | (2006.01) | |
| *B62B 5/06* | (2006.01) | |
| *B62B 7/06* | (2006.01) | |

(52) U.S. Cl.
CPC ................. *A63B 55/08* (2013.01); *B62B 5/067* (2013.01); *B62B 3/02* (2013.01); *B62B 3/12* (2013.01); *B62B 7/068* (2013.01); *B62B 2202/404* (2013.01); *B62B 5/0433* (2013.01); *B62B 2205/12* (2013.01); *B62B 2205/24* (2013.01); *B62B 5/0461* (2013.01); *B62B 2205/22* (2013.01); *B62B 5/064* (2013.01); *Y10S 280/06* (2013.01)
USPC ......................... 280/651; 280/DIG. 6; 280/42

(58) Field of Classification Search
CPC .... B62B 2202/404; B62B 3/12; B62B 1/045; B62B 2202/406; A63B 55/08
USPC .................. 280/47.34, 47.371, 79.6, 38, 639, 280/655.1, 655, 47.26, 47.315
See application file for complete search history.

(56) References Cited

U.S. PATENT DOCUMENTS

| | | | | |
|---|---|---|---|---|
| 5,765,857 A | * | 6/1998 | Hsiao ............................ | 280/646 |
| 5,857,684 A | * | 1/1999 | Liao et al. ..................... | 280/40 |
| 6,152,465 A | * | 11/2000 | Shieh ............................. | 280/62 |
| 6,345,836 B1 | * | 2/2002 | Wu ................................ | 280/651 |
| 6,886,852 B2 | * | 5/2005 | Cheng et al. .................. | 280/651 |
| 7,862,053 B2 | * | 1/2011 | Liao ............................ | 280/47.34 |
| 8,366,140 B2 | * | 2/2013 | Wu ................................ | 280/651 |
| 8,393,633 B2 | * | 3/2013 | Liao ............................. | 280/651 |
| 2002/0112561 A1 | * | 8/2002 | Liao ............................. | 74/551.3 |
| 2005/0173895 A1 | * | 8/2005 | Lin .............................. | 280/651 |
| 2008/0246238 A1 | * | 10/2008 | Wu ............................. | 280/47.18 |
| 2009/0079165 A1 | * | 3/2009 | Liao ............................. | 280/646 |

* cited by examiner

*Primary Examiner* — Katy M Ebner
*Assistant Examiner* — Emma K Frick
(74) *Attorney, Agent, or Firm* — Maier & Maier, PLLC

(57) ABSTRACT

A folding golf cart composed of a frame, pillar, handle, handle connector secured to the top of the pillar, and a frame connector secured to the rear end of frame. The handle is rotatably connected with the handle connector, the bottom end of the pillar is pivoted to the frame connector and the rear wheel carrier is connected on both sides of the frame connector. A frame lock is connected between the pillar and frame connector, a handle lock is connected between the handle and handle connector. The handle lock is composed of a manipulator rotatably connected with the handle connector and two gear joint sockets connected with the handle. The two gear joint sockets are pivoted respectively on both sides of the handle connector. Clutch gears for engaging with the gear joint socket are arranged between the manipulator and two gear joint sockets.

10 Claims, 6 Drawing Sheets

FOLDING GOLF CART

RELATED APPLICATIONS

This application claims priority under 35 U.S.C. §119 to Chinese Patent Application 201220218142.1 filed May 11, 2012, the disclosure of which is incorporated by reference herein in its entirety.

TECHNICAL FIELD

This utility model concerns the golf cart field, especially one type of folding golf cart.

BACKGROUND TECHNOLOGY

As principal requirements, the frame of a golf cart must be large enough to carry different sizes of golf bags. Generally, the upper and lower bracket on a golf cart support the upper and lower parts of a golf bag. This means that a large spacing should exist between upper and lower bracket of golf bags, which cause difficulties with storage or transportation of golf carts. The existing folding golf cart mainly comprises a frame, pillar and handle etc. The pillar, frame and handle are generally fastened with screws. Extending or folding of handles and frame are adjusted by adjusting screw. The several parts need be adjusted respectively to fold or extend them. It is not convenient to perform these operations.

CONTENTS OF UTILITY MODEL

The purpose of the utility model is to put forward one model of easy-to-use folding golf cart aiming at deficiencies in existing technologies.

The technical solutions adopted in the utility model to achieve the above purposes are described as below:

The folding golf cart is composed of a frame, pillar, handle, handle connector secured to the top of pillar, frame connector secured to the rear end of frame. The handle is rotatably connected with the handle connector, the bottom end of the pillar is pivoted to the frame connector, and the rear wheel carrier is connected on both sides of the frame connector. A frame lock is connected between the pillar and frame connector, a handle lock is connected between the handle and handle connector. The handle lock is composed of a manipulator rotatably connected with the handle connector and 2 gear joint sockets connected with the handle. The two gear joint sockets are pivoted respectively on both sides of the handle connector. The clutch gears for engaging with the gear joint socket are arranged between the manipulator and two clear joint sockets. The clutch gear is mounted inside the handle connectors by sliding means. The manipulator has a thrust surface which is able to push and engage clutch gear with the gear joint socket, on both sides of the manipulator. The internal end of the clutch gear is pushed and pressed against the thrust surface. The manipulator is connected with the frame lock through a connector.

An outer taper gear ring is mounted on the external end surface of the said clutch gear, and an inner taper gear ring matching the outer gear ring is mounted where the gear joint socket is connected with the clutch gear. The teeth of outer taper gear ring and inner taper gear ring are of stepped shape. A return spring is provided between the clutch gear and gear joint socket. Small cylinders are mounted on the inner end surface of the clutch gear and pressed against the thrust surface.

The said gear joint socket is pivoted to the handle connector through a positioning shaft. The positioning shaft comprises a middle sleeve and 2 positioning sleeves which are arranged on both sides of the middle sleeve, respectively. One end of the positioning sleeve is pressed against the middle sleeve and another end is pressed against the gear joint socket.

The said frame lock comprises sliding lock body inside the pillar and lock bar connected with the sliding lock body. The sliding lock body is connected with the connector. A lock notch is provided at the top of the frame connector. The lock bar extends away from the pillar and is locked in the lock notch.

The said connector is a steel rope, an adjusting slider is mounted inside the sliding lock body, and the lock bar is secured to the adjusting slider. The adjusting slider has adjusting screws which screwed end extends through the adjusting slider and is connected with the sliding lock body.

The utility model also comprises a sliding sleeve, foldable connecting rod and wheel carrier connecting rod. The two ends of foldable connecting rod are pivoted to the sliding sleeve and main pillar respectively. The two ends of the wheel carrier connecting rod are pivoted to the sliding sleeve and rear wheel carrier respectively.

There is a thrust spring between the said sliding sleeve and frame connector. The thrust spring is externally equipped with a limiting sleeve.

The front end of the said frame is connected with the front wheel through the front wheel releasing device. The front wheel releasing device comprises a front fork, connector fastened to the frame, rotating seat fastened to the rear end of front fork, spring pushing mechanism locking the rotating seat in the released or retracted position. There is a receiving groove at the bottom of the connector, the rear end of the rotating seat is pivoted to the both sides of the receiving groove, the rotating seat has a cam part at its rear end, and the spring push mechanism is connected between the receiving groove and cam part There is a brake on the said rear wheel carrier. The brake comprises the rear wheel, wheel axle, rear wheel bearer fastened to the rear wheel carrier, detent roller secured to the rear wheel, one-way gear rotatably connected with rear wheel bearer, brake pedal driving the one-way gear, push bar sliding on the rear wheel bearer. The rear wheel is rotatably connected with the rear wheel bearer through the wheel axle, the brake pedal is rotatably connected with the rear wheel bearer. The detent roller has a groove for use by the push bar, the one-way gear has trace surface for forward and backward movement of the push bar, on the end surface facing the detent roller. One end of the push bar is pressed against the trace surface and another end extends to the brake groove.

The said trace surface comprises locking surface and unlocking surface. The final end of the locking surface is higher than the starting end of the unlocking surface. The starting end of the locking surface forms unlocking notch. The locking notch is formed between the final end of locking surface and starting end of the unlocking surface.

The advantages of the utility model are as follows: The utility model comprises a frame, pillar, handle, handle connector and frame connector. A frame lock is connected between the pillar and frame connector, a handle lock is connected between the handle and handle connector. The handle lock is composed of a manipulator and 2 gear joint sockets. The two gear joint sockets are pivoted respectively on both sides of the handle connector. The clutch gears are arranged between the manipulator and two gear joint sockets. The clutch gear is mounted inside the handle connectors by sliding means. The manipulator has a thrust surface on both sides. The internal end of the clutch gear is pushed and pressed against the thrust surface. The manipulator is connected with the frame lock through a connector. When the manipulator is pushed, the clutch gear will move inward along the thrust surface so that the clutch gear is disengaged from the gear joint socket. At this point, the gear joint socket can turn and the handle lock is in released position. Operate the manipulator to unlock the frame so as to fold the frame, pillar and handle. The utility model is able to lock and unlock the frame by pushing manipulators. Therefore, it is easy to extend and fold the golf cart.

FIGURE DESCRIPTION

DETAILED IMPLEMENTATION METHOD

Figure 1:
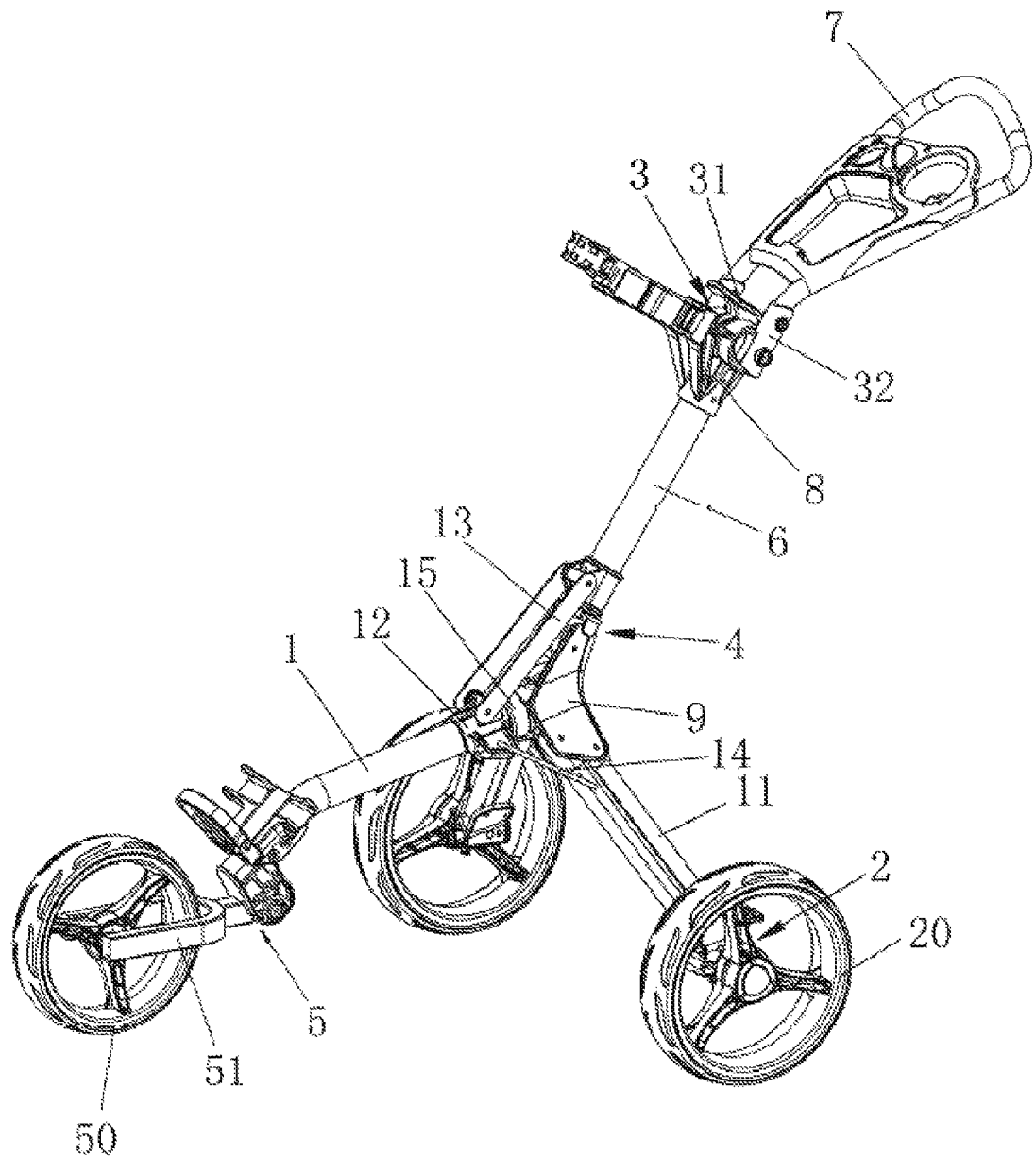
FIG. 1 is a structural representation for the utility model.
Figure 2:
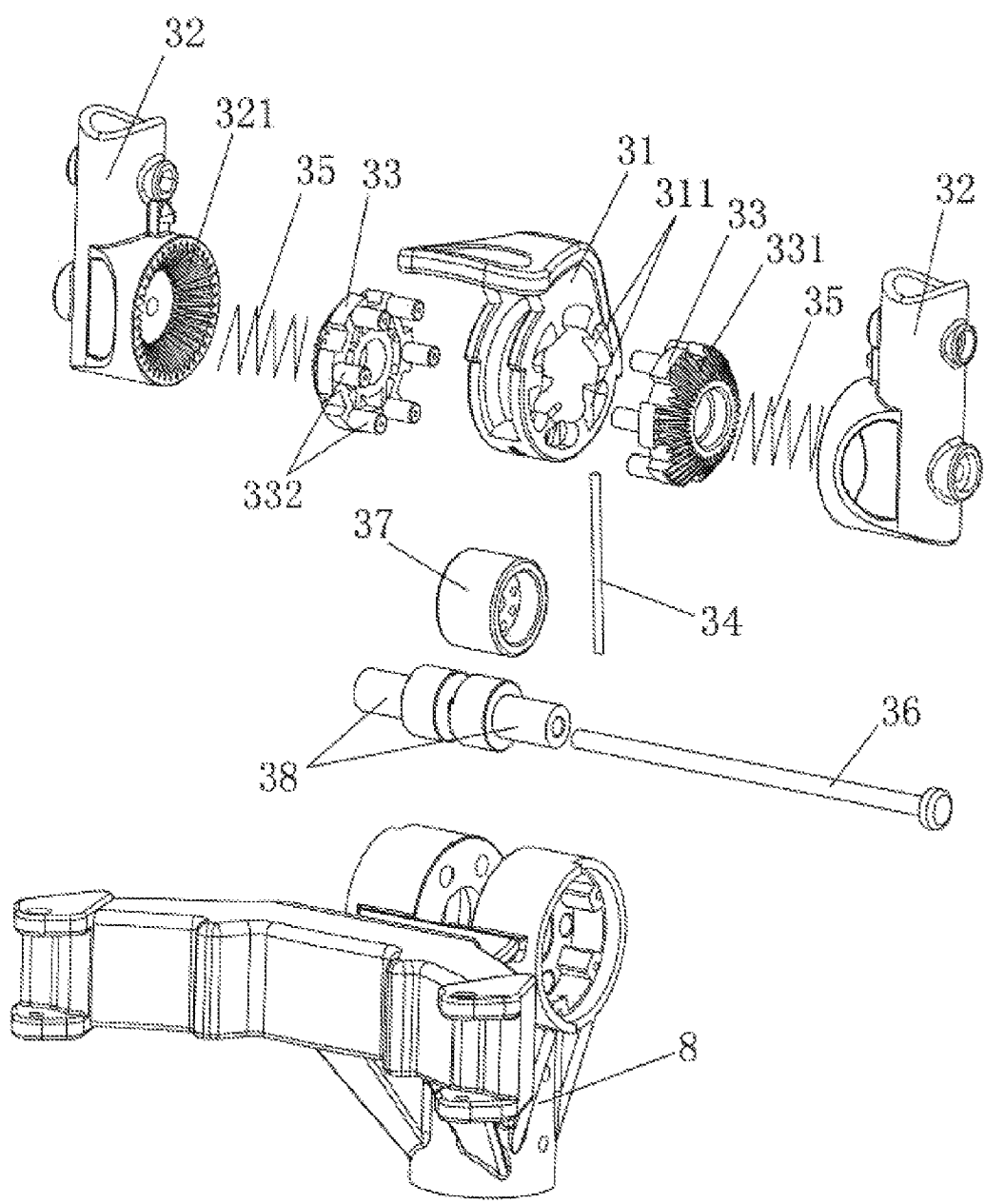
FIG. 2 is an exploded view for the handle lock for the utility model
Figure 3:
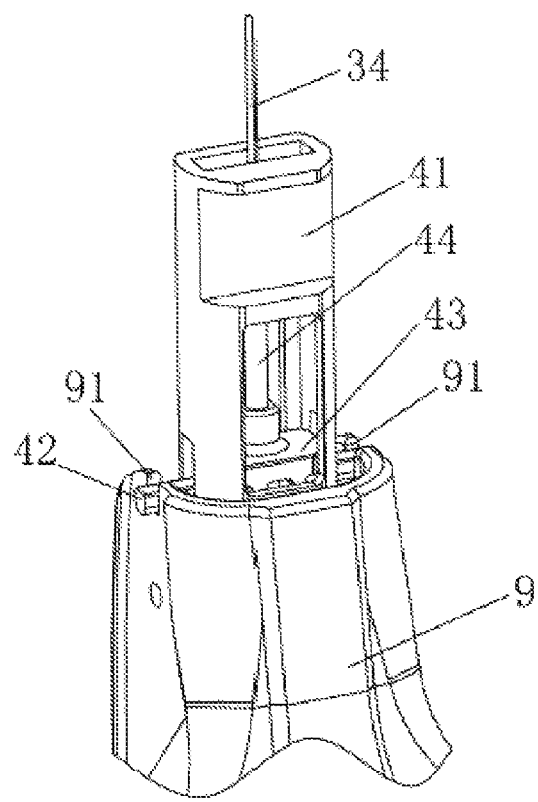
FIG. 3 is a structural representation for the frame lock for the utility model
Figure 4:
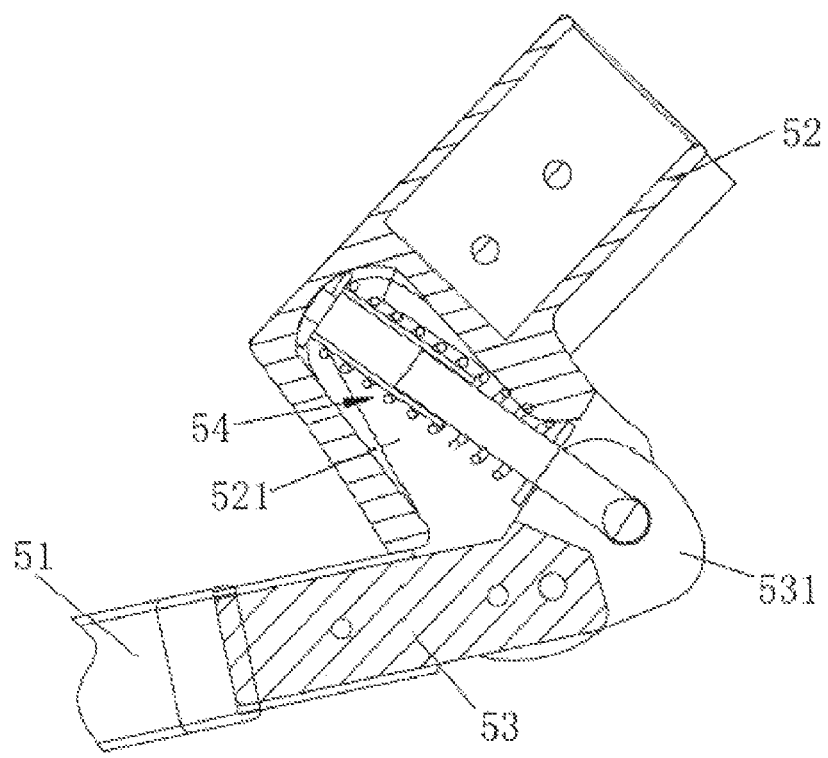
FIG. 4 is a cross-sectional view for the front wheel release device for the utility model.
Figure 5:
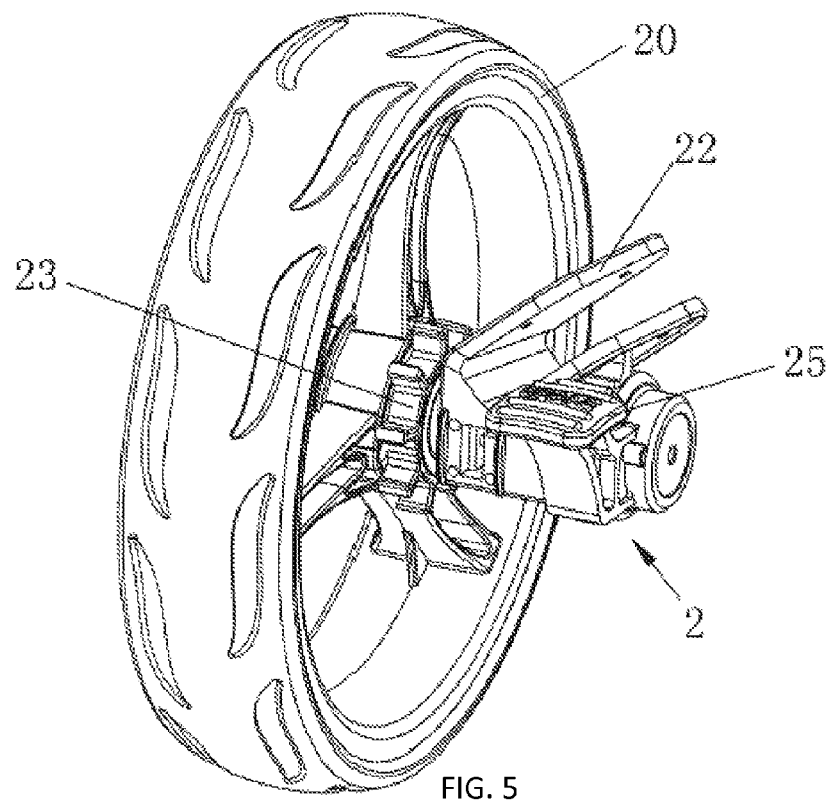
FIG. 5 is a structural representation for the brake for the utility model
Figure 6:
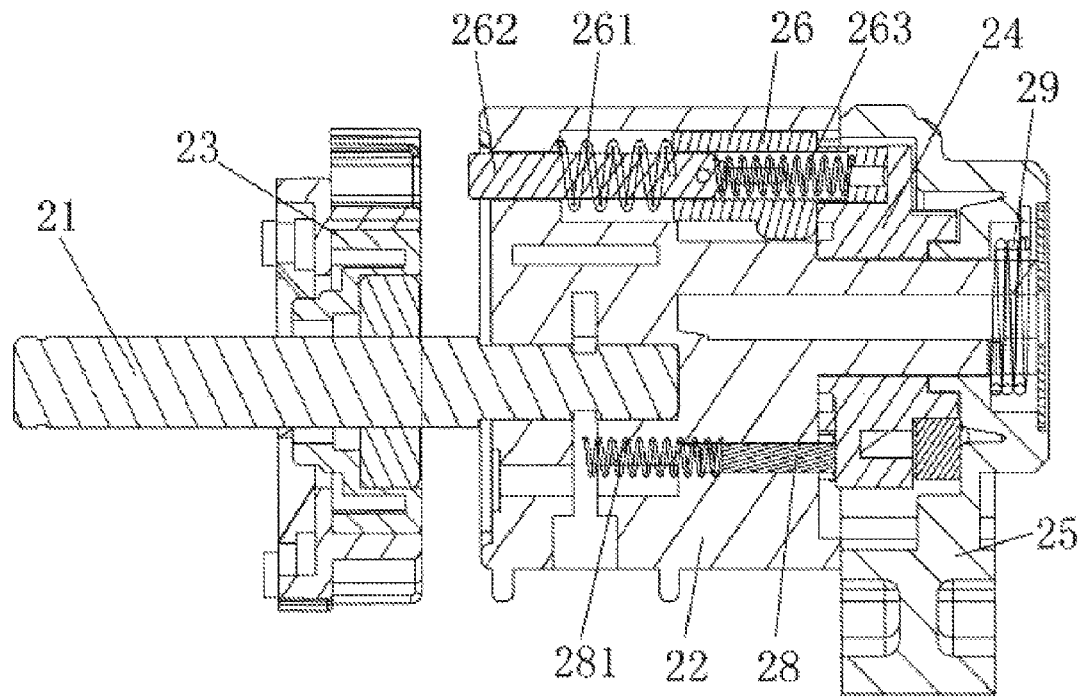
FIG. 6 is a cross-sectional view for the brake for the utility model.
Figure 7:
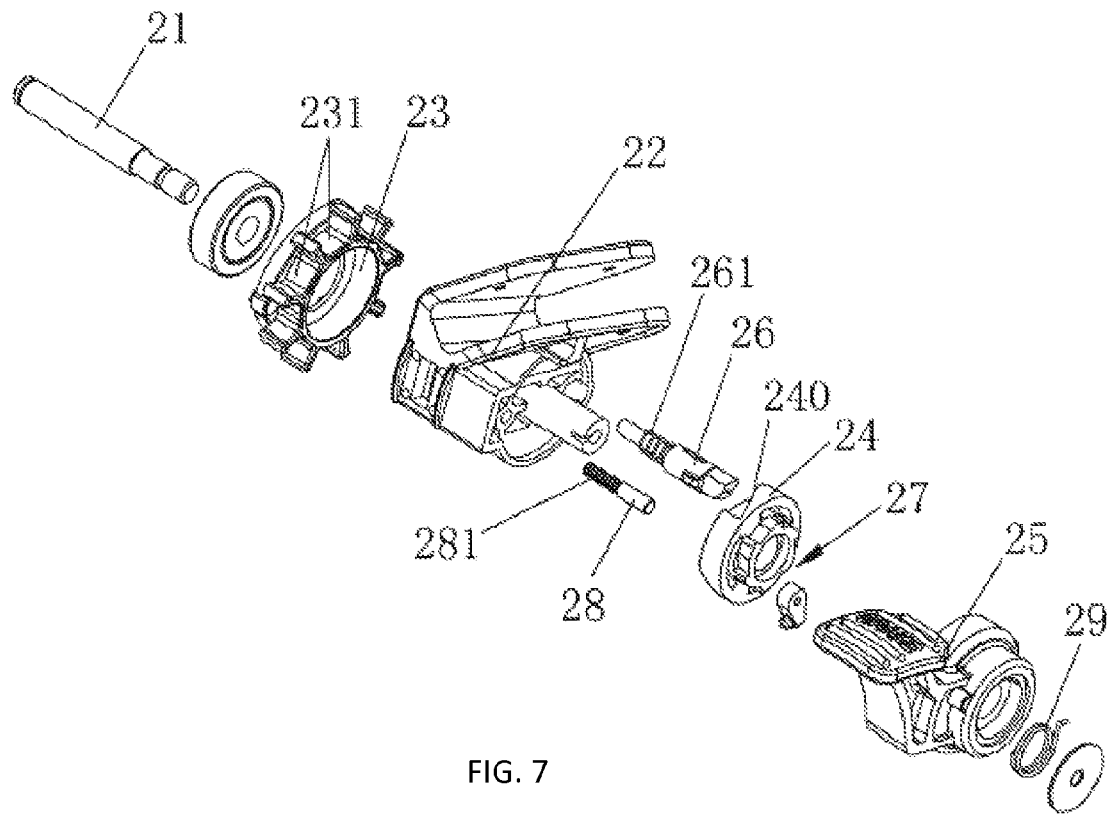
FIG. 7 is an exploded view for the brake for the utility model.
Figure 8:
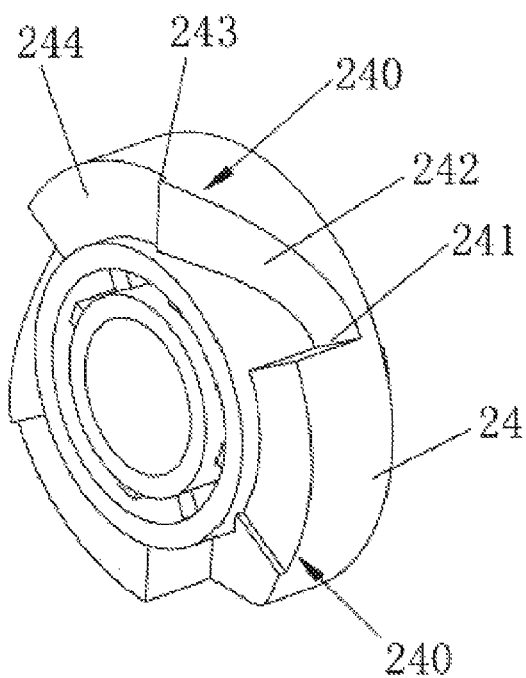
FIG. 8 is a structural representation for the one-way gear for the utility model.
Figure 9:
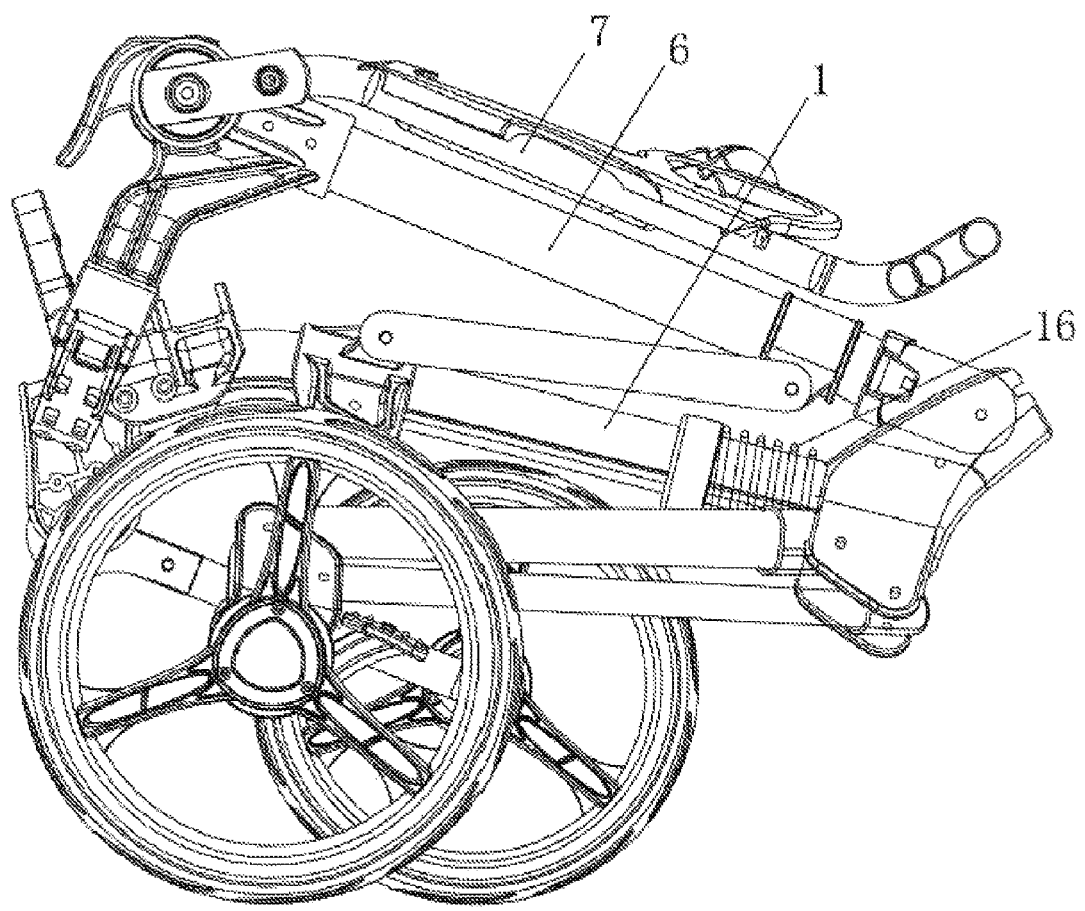
FIG. 9 is a representation for the utility model in folded state.

The following paragraphs will further describe this utility model in combination with the attached figure. As shown in FIGS. 1-9, the folding golf cart is composed of a frame 1, pillar 6, handle 7, handle connector 8 secured to the top of pillar 6, frame connector 9 secured to the rear end of frame 1. The handle 7 is rotatably connected with the handle connector 8, the bottom end of the pillar 6 is pivoted to the frame connector 9 and the rear wheel carrier 11 is connected on both sides of the frame connector 9. A frame lock 4 is connected between the pillar 6 and frame connector 9, a handle lock 3 is connected between the handle 7 and handle connector 8. The handle lock 3 is composed of a manipulator 31 rotatably connected with the handle connector 8 and 2 gear joint sockets 32 connected with the handle 7. The two gear joint sockets 32 are pivoted respectively on both sides of the handle connector 8. The clutch gears 33 for engaging with the gear joint socket 32 are arranged between the manipulator 31 and two gear joint sockets 32. The clutch gear 33 is mounted inside the handle connectors 8 by sliding means. The manipulator 31 has a thrust surface 311 which is able to push and engage clutch gear 33 with the gear joint socket 32, on both sides of the manipulator. The internal end of the clutch gear 33 is pushed and pressed against the thrust surface 311. The manipulator 31 is connected with the frame lock 4 through a connector 34.

An outer taper gear ring 311 is mounted on the external end surface of the said clutch gear 33, the inner taper gear ring 321 matching the outer gear ring 331 is mounted where the gear joint socket 32 is connected with the clutch gear 33. The teeth of outer taper gear ring 331 and inner taper gear ring 321 are of stepped shape so that slippage does not occur between the clutch gear 33 and gear joint socket 32. The whole handle lock 3 is closely jointed to prevent swinging. A return spring 35 is provided between the clutch gear 33 and gear joint socket 32. The return spring 35 is able to automatically push the clutch gear 33 away from the gear joint socket 32. Small cylinders 332 are mounted on the inner end surface of the clutch gear 33 and pressed against the thrust surface 311.

The gear joint socket 32 is pivoted to the handle connector 8 through a positioning shaft 36. The top sleeve of the positioning shaft 36 comprises a middle sleeve 37 and 2 positioning sleeves 38 which are arranged on both sides of the middle sleeve 37, respectively. One end of the positioning sleeve 38 is pressed against the middle sleeve 37 and another end is pressed against the gear joint socket 32 so as to allow clutch gear 33 to slide between the gear joint socket 32 and handle connector 8.

The frame lock 4 comprises sliding lock body 41 inside the pillar 6 and lock bar (42) connected with the sliding lock body 41. The sliding lock body 41 is connected with the connector 34. A lock notch 91 is provided at the top of the frame connector 9. The lock bar 42 extends away from the pillar 6 and is locked in the lock notch 91. When the manipulator 31 is operated, the connector 34 will move the sliding lock body 41 and lock bar 42 upward so that the lock bar 42 leaves the lock notch 91 and unlock operation is performed.

The connector 34 is a steel rope, an adjusting slider 43 is mounted inside the sliding lock body 41, the lock bar 42) is secured to the adjusting slider 43. The adjusting slider 43 has adjusting screws 44) which screwed end extends through the adjusting slider 43 and is connected with the sliding lock body 41. The position of the lock bar 42 relative to the connector 34 can be adjusted by turning the adjustment screw 44. This is equivalent to steel rope length adjustment and can accommodate fabrication error of steel rope and improve the sensitivity of the frame lock 4.

This utility model also comprises a sliding sleeve 12, foldable connecting rod 13 and wheel carrier connecting rod 14 on the frame 1. The two ends of foldable connecting rod 13 are pivoted to the sliding sleeve 12 and main pillar 6 respectively. The two ends of the wheel carrier connecting rod 14 are pivoted to the sliding sleeve 12 and rear wheel carrier 11 respectively. The design ensures that the frame 1 and rear wheel carrier 11 can be folded or extended together with the pillar 6 and therefore the whole cart can be folded or extended only by operating the main pillar 6. There is a thrust spring 16 between the said sliding sleeve 12 and frame connector 9. The thrust spring 16 is externally equipped with a limiting sleeve 15. The thrust spring can help push the sliding sleeve 12 forward to facilitate folding. It is easy to fold the golf cart by applying small force.

The operating principle of this utility model is as follows: When pushing the manipulator 31 forward, the clutch gear 33 will move inward along the thrust surface 311 so that the clutch gear 33 is disengaged from the gear joint socket 32. At this point, the gear joint socket 32 can rotate and the handle lock 3 is in released position. Meanwhile, the manipulator 31 will unlock the frame lock 4 through connector 34 so as to fold the frame 1, pillar 6 and handle 7. When pushing the manipulator 31 backward, the thrust surface 311 will push the clutch gear 33 so that it is engaged with the gear joint socket 32. At this point, the gear joint socket 32 cannot rotate, the handle lock 3 is locked and meanwhile the frame lock 4 is again locked.

The front end of the frame 1 is connected with the front wheel 50 through the front wheel releasing device 5. The front wheel releasing device comprises a front fork 51, connector 52 secured to the frame 1, rotating seat 53 secured to the rear end of front fork 51, spring pushing mechanism 54 locking the rotating seat 53 in the released or retracted position. There is a receiving groove 521 at the bottom of the connector 52, the rear end of the rotating seat 53 is pivoted to the both sides of the receiving groove 521, the rotating seat 53 has a cam part 531 at its rear end, and the spring push mechanism 54 is connected between the receiving groove 521 and cam part 531. The spring pushing mechanism 54 is made of spring. When the front fork 51 is retracted or extended, the front fork will tend to rotate downward because of the weight of the front wheel 50, front fork 51 and rotating seat 53. On the other hand, the spring pushing mechanism 54 tends to push the cam 531 of the rotating seat 53 so that the rotating seat 53 rotates upward and counteract the weight of front wheel, front fork 51 and rotating seat 53. Therefore, the front fork 51 is locked in the retracted or extended position. When the front fork 51 can be freely retracted or extended by applying suitable force, the front fork 51 can rotate through 180 degrees. It is easy to fold or extend the front fork rapidly and by applying small force. This utility model will greatly reduce golf cart size, save spaces and facilitate storage and transportation.

There is a brake 2 on the rear wheel carrier 11. The brake 2 comprises the rear wheel 20, wheel axle 21, rear wheel bearer 22 fastened to the rear wheel carrier 11, detent roller 23 secured to the rear wheel 20, one-way gear 24 rotatably connected with rear wheel bearer 22, brake pedal 25 driving the one-way gear 24, push bar 26 sliding on the rear wheel bearer 22. The rear wheel 20 is rotatably connected with the rear wheel bearer 22 through the wheel axle 21, the brake pedal 25 is rotatably connected with the rear wheel bearer 22. The detent roller 23 has a brake groove 231 for use by the push bar 26, the one-way gear 24 has trace surface 240 for forward and backward movement of the push bar 26, on the end surface facing the detent roller 23. One end of the push bar 26 is pressed against the trace surface 240 and another end extends to the brake groove 231.

The trace surface 240 comprises locking surface 242 and unlocking surface 244. The final end of the locking surface 242 is higher than the starting end of the unlocking surface 244. The starting end of the locking surface 242 forms unlocking notch 241. The locking notch 243 is formed between the final end of locking surface 242 and starting end of the unlocking surface 244. The movement of the push bar 26 along the trace surface 240 can perform cart locking and unlocking. The structure is very simple.

The one-way gear 24 has several trace surfaces 240 evenly distributed circumferentially, on the end surface facing the detent roller 23. The golf cart can be locked and unlocked several times through one rotation of the one-way gear 24. For this implementation mode, there are four trace surfaces 240.

The brake pedal 25 drives the one-way gear 24 through the ratchet mechanism 27. The ratchet mechanism 27 can prevent one-way gear from moving backwards so that the brake pedal can drive the one-way gear 24 in one direction. When the brake pedal 25 is stepped on, the one-way gear 24 will rotate. When the brake pedal 25 is reset, the one-way gear 24 will not rotate.

The stop pin 28 and pin spring 281 are mounted between the one-way gear 24 and rear gear bearer 22. One end of the stop pin 28 is connected with the rear wheel bearer 22 through the stop pin spring 281 and another end is pressed against the trace surface 240. The stop pin 28 and push bar 26 are symmetrically arranged on both sides of the rear wheel bearer 22. When the stop pin 28 resets the brake pedal 25, the one-way gear 24 will not rotate together with the brake pedal 25.

The push bar return spring 261 is connected between the push bar 26 and rear wheel bearer 22 so that the push bar 26 is always pressed against the trace surface 240. A telescoping rod 262 is inserted at the end of push bar 26 facing the detent roller 23. A return spring 263 is provided between the telescoping rod 262 and push bar 26. When the push bar 26 moves forward and presses against other positions, the telescoping rod 262 is able to automatically retract or extend to prevent damage.

Many brake grooves 231 are evenly distributed circumferentially on the detent roller 23 so that it is easy to lock the golf cart. A pedal return spring 29 is connected between the brake pedal 25 and rear wheel bearer 22 so that the brake pedal 25 can automatically return to its home position.

The operating principle of the brake is as follows: under the normal state, the brake is released and the push bar 26 is positioned in the unlocking notch 241. When stepping on the brake pedal 25, the brake pedal 25 will drive the one-way gear through certain angle. Being locked by the trace surface 240 and pushed by the thrust surface 242, the push bar 26 moves forward and is clamped by the brake groove 231. And the push bar 26 is locked in the lock groove 243. At this point, the brake unit is engaged and the brake pedal 25 returns to its home position because of the effect of the return spring 29. When stepping on the brake pedal 25 again, the brake pedal 25 will further drive the one-way gear 24 through certain angle. Being unlocked by the trace surface 240 and pushed by the thrust surface 244, the push bar 26 continue to move forward. The push bar falls into the unlocking notch 241 of the next trace surface 240 through the final end of the unlocking surface 244 so that the push bar moves backward and leaves the brake groove 231. At this point, the brake is disengaged and brake pedal 25 returns to its home position because of the effect of the return spring 29. For this utility model, persons can lock and unlock the golf cart only by stepping on the brake pedal 25. It is convenient to operate the golf cart.

To sum up, for the utility model, the cart frame can be locked and unlocked by operating the manipulator 31 and it is easy to fold and extend the golf cart. It is easy to operate the golf cart. The golf cart can be folded in three sections in Z shape. The whole golf cart can be entirely and freely extended or folded through only one action. It is easy to fold or extend the golf cart and the utility model will greatly reduce golf cart size, save spaces and facilitate storage and transportation.

Of course, the above description is the good practice of the utility model. Therefore, any equivalent variation or dressing made in accordance with the structure, characteristics and principles described in the range of the application for patent of utility model is included in the range of the application for patent of utility model Figures Attached to the Instruction Manual

1: FIG. 1

What is claimed is:

1. A folding golf cart comprising:
  a frame;
  a pillar;
  a handle;
  a handle connector secured to the top of pillar;
  a frame connector secured to the rear end of the frame wherein the handle is rotatably connected with the handle connector, the bottom end of the pillar is pivoted to the frame connector and a rear wheel carrier is connected on both sides of the frame connector;
  a frame lock connected between the said pillar and frame connector;
  a handle lock connected between the handle and handle connector, the handle lock composed of a manipulator rotatably connected with the handle connector and two gear joint sockets connected with the handle, the two gear joint sockets are pivoted respectively on both sides of the handle connector, a plurality of clutch gears for engaging with the gear joint sockets arranged between the manipulator and two gear joint sockets; and wherein each clutch gear is slidably mounted inside the handle connector, the manipulator has a thrust surface which is able to push and engage the clutch gear with the gear joint socket, on both sides of the manipulator, an internal end of the clutch gear is pushed and pressed against the thrust surface, and the manipulator is connected with the frame lock through a connector.

2. The folding golf cart as recited in claim 1, further comprising:
an outer taper gear ring mounted on an external end surface of the said clutch gear;
an inner taper gear ring matching the outer taper gear ring mounted where the gear joint socket is connected with the clutch gear;
a plurality of stepped shape teeth are provided on the outer taper gear ring and the inner taper gear ring;
a return spring between the clutch gear and gear joint socket; and
a plurality of small cylinders mounted on an inner end surface of the clutch gear and pressed against the thrust surface.

3. The folding golf cart as recited in claim 1, further comprising;
the gear joint socket is pivoted to the handle connector through a positioning shaft;
a top sleeve of the positioning shaft has a middle sleeve and two positioning sleeves arranged on both sides of the middle sleeve, respectively, wherein one end of each positioning sleeve is pressed against the middle sleeve and another end is pressed against the gear joint socket.

4. The folding golf cart as recited in claim 1, further comprising:
the frame lock has a sliding lock body inside the pillar and a lock bar connected with the sliding lock body, wherein the sliding lock body is connected with the connector; and
a lock notch at the top of the frame connector, wherein the lock bar extends away from the pillar and is locked in the lock notch.

5. The folding golf cart as recited in claim 4, further comprising:
the connector is a steel rope;
an adjusting slider mounted inside the sliding lock body, the lock bar secured to the adjusting slider, wherein the adjusting slider has adjusting screws with screwed ends extending through the adjusting slider and connecting with the sliding lock body.

6. The folding golf cart as recited in claim 1, further comprising:
a sliding sleeve;
a foldable connecting rod; and
a wheel carrier connecting rod
wherein a first end of the foldable connecting rod is pivoted to the sliding sleeve and a second end of the foldable connecting rod is pivoted to the main pillar
wherein a first end of the wheel carrier connecting rod is pivoted to the sliding sleeve and a second end is pivoted to the rear wheel carrier.

7. The folding golf cart as recited in claim 6, further comprising:
a thrust spring between the sliding sleeve and frame connector, the thrust spring is externally equipped with a limiting sleeve.

8. The folding golf cart as recited in claim 1, further comprising:
a front end of the frame is connected with a front wheel through a front wheel releasing device, the front wheel releasing device comprises:
a front fork;
a second connector secured to the frame;
a rotating seat secured to a rear end of the front fork;
a spring pushing mechanism locking the rotating seat in a released or retracted position;
a receiving groove at the bottom of the second connector, a rear end of the rotating seat is pivoted to both sides of the receiving groove; and
a cam part at the rear end of the rotating seat, wherein the spring pushing mechanism is connected between the receiving groove and cam part.

9. The folding golf cart as recited in claim 1, further comprising:
a brake on the rear wheel carrier, the brake comprising:
a rear wheel;
a wheel axle;
a rear wheel bearer fastened to the rear wheel carrier;
a detent roller secured to the rear wheel;
a one-way gear rotatably connected with the rear wheel bearer;
a brake pedal driving the one-way gear; and
a push bar sliding on the rear wheel bearer;
wherein the rear wheel is rotatably connected with the rear wheel bearer through the wheel axle, the brake pedal is rotatably connected with the rear wheel bearer, the detent roller has a brake groove for use by the push bar, the one-way gear has a trace surface for forward and backward movement of the push bar, on an end surface facing the detent roller, and one end of the push bar is pressed against the trace surface and another end extends to the brake groove.

10. The folding golf cart as recited in claim 9, further comprising:
the trace surface comprises a locking surface and an unlocking surface, wherein
a final end of the locking surface is higher than a starting end of the unlocking surface, the starting end of the locking surface forms an unlocking notch, and a locking notch is formed between the final end of locking surface and starting end of the unlocking surface.

* * * * *